(12) United States Patent
Zou et al.

(10) Patent No.: US 8,824,727 B2
(45) Date of Patent: Sep. 2, 2014

(54) SELECTION OF WATERMARKS FOR THE WATERMARKING OF COMPRESSED VIDEO

(75) Inventors: Dekun Zou, Princeton, NJ (US); Jeffrey Adam Bloom, West Windsor, NJ (US); Shan He, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 218 days.

(21) Appl. No.: 12/737,829

(22) PCT Filed: Aug. 18, 2009

(86) PCT No.: PCT/US2009/004706
§ 371 (c)(1),
(2), (4) Date: Feb. 18, 2011

(87) PCT Pub. No.: WO2010/021694
PCT Pub. Date: Feb. 25, 2010

(65) Prior Publication Data
US 2011/0158465 A1    Jun. 30, 2011

Related U.S. Application Data

(60) Provisional application No. 61/189,551, filed on Aug. 20, 2008.

(51) Int. Cl.
*G06K 9/00* (2006.01)
*H04N 7/34* (2006.01)
*H04N 7/26* (2006.01)
*G06T 1/00* (2006.01)

(52) U.S. Cl.
CPC .. *H04N 19/00763* (2013.01); *G06T 2201/0053* (2013.01); *G06T 2201/0202* (2013.01); *G06T 2201/0061* (2013.01); *H04N 19/002* (2013.01); *G06T 1/0028* (2013.01); *H04N 19/00557* (2013.01); *G06T 2201/0051* (2013.01)
USPC ........................................................ 382/100

(58) Field of Classification Search
USPC .................. 382/100, 232–253; 380/200–242; 358/3.28, 426.01–426.16; 348/384.1–440.1; 375/122, 375/240.01–240.29
See application file for complete search history.

(56) References Cited

U.S. PATENT DOCUMENTS

| 5,867,109 A | 2/1999 | Wiedeman |
| 6,009,176 A | 12/1999 | Gennaro et al. |

(Continued)

FOREIGN PATENT DOCUMENTS

| CN | 101218830 | 7/2008 |
| EP | 1515506 | 3/2005 |

(Continued)

OTHER PUBLICATIONS

Dekun Zou, et al: "H.264/AVC stream replacement technique for video watermarking", Acoustics,Speech and Signal Processing 2008, Mar. 31, 2008, pp. 1749-1752, XP031250910, Piscataway, NJ, USA.

(Continued)

*Primary Examiner* — Atiba O Fitzpatrick
(74) *Attorney, Agent, or Firm* — Robert D. Shedd; Jeffrey M. Navon

(57) ABSTRACT

A method comprises accessing changes which can be watermarks in a list for coded data, the changes having an syntax element, an original value and an candidate alternative value; determining for a subset a group of compliant changes from the changes, the complaint changes being compliant with a coding protocol such as a CABAC encoding protocol; and selecting for the subset only compliant changes that result in the subset having only one candidate alternative value for each syntax elements and result in only compliant changes also meeting at least one performance criterion. The method can include determining fidelity, recoverability, or robustness of the watermarks and removing or preventing watermarks from being in the subset based on the fidelity, recoverability, or robustness, wherein fidelity, recoverability, and robustness are performance criteria. The method can include determining at least two performance values for the watermarks, determining some collective metric of the at least two performance values, and removing or preventing watermarks from being in the subset based on the same collective metric.

20 Claims, 2 Drawing Sheets

(56) References Cited

U.S. PATENT DOCUMENTS

| | | |
|---|---|---|
| 6,064,661 A | 5/2000 | Benn |
| 6,341,350 B1 | 1/2002 | Miyahara et al. |
| 6,373,960 B1 | 4/2002 | Conover et al. |
| 6,687,384 B1 | 2/2004 | Isnardi |
| 6,894,628 B2 | 5/2005 | Marpe et al. |
| 6,900,748 B2 | 5/2005 | Marpe et al. |
| 7,113,612 B2 | 9/2006 | Sugahara et al. |
| 7,159,117 B2 | 1/2007 | Tanaka |
| 7,197,164 B2 | 3/2007 | Levy |
| 7,286,710 B2 | 10/2007 | Marpe et al. |
| 7,646,881 B2 | 1/2010 | Zarrabizadeh |
| 7,839,312 B2 | 11/2010 | Tanaka et al. |
| 7,865,034 B2 | 1/2011 | So |
| 7,974,714 B2 | 7/2011 | Hoffberg |
| 8,121,341 B2 | 2/2012 | Tapson et al. |
| 8,189,854 B2 | 5/2012 | Watson |
| 8,559,501 B2 | 10/2013 | Chen et al. |
| 2002/0097892 A1 | 7/2002 | Oami et al. |
| 2002/0136428 A1 | 9/2002 | Sugahara et al. |
| 2003/0070075 A1 | 4/2003 | Deguillaume |
| 2004/0017852 A1 | 1/2004 | Garrido et al. |
| 2004/0168110 A1 | 8/2004 | Fuldseth et al. |
| 2004/0247154 A1 | 12/2004 | Bodo et al. |
| 2005/0044411 A1 | 2/2005 | Somin et al. |
| 2005/0069169 A1 | 3/2005 | Zarrabizadeh |
| 2005/0123207 A1 | 6/2005 | Marpe et al. |
| 2005/0207499 A1 | 9/2005 | Hwang et al. |
| 2006/0078292 A1 | 4/2006 | Huang et al. |
| 2006/0222344 A1 | 10/2006 | Ukai et al. |
| 2006/0236130 A1 | 10/2006 | Ito et al. |
| 2006/0269096 A1 | 11/2006 | Kumar et al. |
| 2007/0053438 A1 | 3/2007 | Boyce et al. |
| 2007/0110033 A1 | 5/2007 | Tu et al. |
| 2007/0242862 A1 | 10/2007 | Watson et al. |
| 2008/0009272 A1 | 1/2008 | Toledano |
| 2008/0063071 A1 | 3/2008 | Suzuki |
| 2008/0165849 A1 | 7/2008 | Moriya et al. |
| 2008/0247469 A1 | 10/2008 | Vadapalli et al. |
| 2009/0290750 A1 | 11/2009 | Tapson et al. |
| 2010/0176610 A1 | 7/2010 | He et al. |
| 2011/0129116 A1* | 6/2011 | Thorwirth ...................... 382/100 |
| 2011/0176610 A1 | 7/2011 | He et al. |
| 2011/0222723 A1 | 9/2011 | He et al. |
| 2011/0293016 A1 | 12/2011 | Suzuki |
| 2012/0237078 A1 | 9/2012 | Watson et al. |
| 2013/0058395 A1 | 3/2013 | Nilsson et al. |
| 2013/0058405 A1 | 3/2013 | Zhao et al. |
| 2013/0208814 A1 | 8/2013 | Argyropoulos et al. |

FOREIGN PATENT DOCUMENTS

| | | |
|---|---|---|
| EP | 1909508 | 4/2008 |
| JP | 11331622 | 11/1999 |
| JP | 11341450 | 12/1999 |
| JP | 11346302 | 12/1999 |
| JP | 2001119557 | 4/2001 |
| JP | 2003125227 | 4/2003 |
| JP | 2003134329 | 5/2003 |
| JP | 2003179740 | 6/2003 |
| JP | 2003529297 | 9/2003 |
| JP | 2004221715 | 8/2004 |
| JP | 2005533410 | 11/2005 |
| JP | 2006279992 | 10/2006 |
| JP | 2006287364 | 10/2006 |
| JP | 2006303580 | 11/2006 |
| JP | 2007053687 | 3/2007 |
| JP | 2007525074 | 8/2007 |
| WO | WO2004066206 | 8/2004 |
| WO | WO2007/067168 | 6/2007 |
| WO | WO2008065814 | 6/2008 |
| WO | WO2008/118145 | 10/2008 |
| WO | WO2008/154041 | 12/2008 |

OTHER PUBLICATIONS

Mobasseri, B.G., et al: Authentication of H.264 streams by direct watermarking of CAVLC blocks, The International Society for Optical Engineering, Spie, US, pp. 1-5, Feb. 27, 2007.

European Search Report dated Jan. 2, 2010.

Nguyen et al., "A Fast Watermarking System for H.264/AVC Video," 2006 IEEE, Dept. of Electronic Engineering, La Trobe University, Bundoora, Australia, pp. 81-84.

Seo et al., "Low-Complexity Watermarking Based on Entropy Coding in H.264/AVC," IEICE Trans. Fundamentals, vol. E91-A, No. 8, Aug. 2008.

Noorkami, "Secure and Robust Compressed-Domain Video Watermarking for H.264," A Thesis Presented to The Academic Faculty at Georgia Institute of Technology, 124 pages, Aug. 2007.

Song et al., "A Data Embedded Video Coding Scheme for Error-Prone Channels", IEEE Transactions on Multimedia, vol. 3, No. 4, Dec. 1, 2001, pp. 415-423.

Liu et al., "Data Hiding in Inter and Intra Prediction Modes of h.264/AVC", IEEE Int'l. Symposium on Circuits and Systems, 2008 (ISCAS 2008), May 18, 2008, pp. 3025-3028.

Profrock et al., "H.264/AVC Video Authentication using Skipped Macroblocks for an Erasable Watermark", Visual Communications and Image Processing, 2005 SPIE, Bellinigham, WA 2005.

Hu, "Information Hiding Based on Intra Predictioin Modes for H.264 AVC", Multimedia and Expo, 2007 IEEE, International Conference, IEEE PI, Jul. 1, 2007, pp. 1231-1234.

Winkler, "Preceptual Quality Assessments for Video Watermarking", Proceedings from the IEEE Conference on Standardizaton and Innovation in Information Technology, Oct. 18, 2002, pp. 90-94.

* cited by examiner

SELECTION OF WATERMARKS FOR THE WATERMARKING OF COMPRESSED VIDEO

CROSS REFERENCE

This application claims the benefit, under 35 U.S.C. §365 of International Application PCT/US2009/004706 and filed Aug. 18, 2009, which was published in accordance with PCT Article 21(2) on Feb. 25, 2010, in English and which claims the benefit of U.S. provisional patent application No. 61/189,551, filed on Aug. 20, 2008, in English.

FIELD OF THE INVENTION

The present invention relates to embedding watermarks in CABAC (Context-based Adaptive Binary Arithmetic Coding) video streams.

BACKGROUND OF THE INVENTION

Today, the demand for digital watermarking as an antipiracy technology is strong. To make it more difficult for pirates to circumvent watermarks it is important for many potential watermarks to be proposed and used. However, it is important for watermarks to not interfere with the intended viewing experience for the intended audience. As such, a need exists for more efficient watermarking techniques. As such, a goal of this invention is to generate a list of possible changes generally associated with watermarking that are CABAC (Context-based Adaptive Binary Arithmetic Coding)/AVC (Advanced Video Coding) compliant, and yet do not create visible artifacts, thereby ultimately providing an efficacious method for embedding watermarks in a CABAC video stream.

SUMMARY OF THE INVENTION

A method comprises accessing potential changes that can be changeable syntax elements in a coded data stream, which can be a coded video stream; determining detectability and/or visibility of the changes to an observer, prior to applying the changes; determining recoverability of the changes for a watermarking detector, prior to applying the changes; determining embedibility of the changes for the coding means which can include compliance with standards or various rules or constraint, prior to applying the changes; and generating a list of changes meeting threshold criteria for detectability and recoverability. The method can comprise determining a feature vector for the changeable syntax elements, wherein the feature vector is a function of the detectability, recoverability, and embedibility, a limit can be set for the feature vector, and only changes meeting the limit for the feature vector are added to the list. The method can further comprise establishing balance criterion between said detectability, recoverability, and embedibility and adding only the changes meeting the balance criterion. The method can also include accessing the video data that is divided into blocks and characterizing at least one block by at least one of the following: luminance, before and after applying changes, mean square error between the video before and after applying changes, block pixel variance, before and after applying changes, or blockiness. The method can further include combinations in which propagation maps for the changes prior to applying the changes are made and the propagation maps are used for the selection of the changes to add to the list. The selection criterion can include size of the propagation map; maximum luminance change of all blocks in the propagation map; maximum mean square error of all blocks in the propagation map; and number of blocks in the propagation path that satisfy detectability criteria.

An additional method comprises accessing changes which can be watermarks in a list for coded data, the changes having an syntax element, an original value and an candidate alternative value; determining for a subset a group of compliant changes from the changes, the complaint changes being compliant with a coding protocol such as a CABAC encoding protocol; and selecting for the subset only compliant changes that result in the subset having only one candidate alternative value for each syntax elements and result in only compliant changes also meeting at least one performance criterion. The method can include determining fidelity, recoverability, or robustness of the watermarks and removing or preventing watermarks from being in the subset based on the fidelity, recoverability, or robustness, wherein fidelity, recoverability, and robustness are performance criteria. The method can include determining at least two performance values for the watermarks, determining some collective metric of the at least two performance values, and removing or preventing watermarks from being in the subset based on the some collective metric.

Another method comprises accessing, generating, or compiling changes or watermarks in a list for coded data, the changes having an syntax element, an original value and an candidate alternative value; determining for a subset a group of compliant changes from the changes, the complaint changes being compliant with a coding protocol; and selecting for the subset only compliant changes having at least one performance criterion other than the coding protocol. The coded data can be in a transport stream and changes can be removed or prevented from being in the subset when the changes have syntax elements that cross a transport stream packet boundary. Further steps can include generating a propagation map for the changes prior to applying the changes; and removing or preventing changes from being in the subset that have any block that falls in the propagation path of a previously selected change. The method can further include determining fidelity, recoverability, or robustness of the changes and removing or preventing changes from being in the subset based on the fidelity, recoverability, or robustness, wherein fidelity, recoverability, and robustness are performance criteria.

An apparatus comprises a means for accessing or generating changes such as watermarks in a list for coded data such as video stream, the changes having a syntax element, an original value and a candidate alternative value; a means for determining for a subset a group of compliant changes from the changes, the complaint changes being compliant with a coding protocol; and a means for selecting for the subset only compliant changes that result in the subset having one or more candidate alternative value for each syntax elements and result in only compliant changes also meeting at least one performance criterion. The coding protocol can be a CABAC encoding protocol. The apparatus can further comprise a means for determining fidelity, recoverability, or robustness of the watermarks and a means for removing or preventing watermarks from being in the subset based on the fidelity, recoverability, or robustness, wherein fidelity, recoverability, and robustness are performance criteria. Additionally, the apparatus can comprise a means for determining at least two performance values for the watermarks, a means for determining some collective metric of the at least two performance values, and a means for removing or preventing watermarks from being in the subset based on the some collective metric.

BRIEF DESCRIPTION OF THE DRAWINGS

The invention will now be described by way of example with reference to accompanying drawings.

DESCRIPTION OF THE INVENTION

Figure 1:
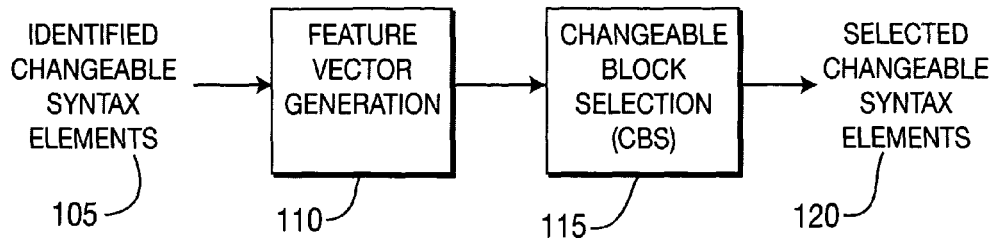
FIG. 1 illustrates an overview of the process of selecting changeable syntax elements.

Embodiments of the invention will now be described generally within the context of CABAC encoded H.264/AVC video streams. However, the embodiments can have broader applications.

The changes can be watermarks and these changes can be applied by embedding changing data bytes in a CABAC coded video stream. The method involves identifying changeable syntax elements in a H.264 coded video stream which can be modified into a candidate list of changes for watermark embedding. A subset of the changeable syntax elements list is used for watermark embedding. The embodiments can include implementations of steps that address at least the problem of selecting which elements of the list that will be in the subset used for watermarking.

Herein will be described a method for modifying a CABAC-encoded H.264/AVC stream and a method for generating a list of CABAC/AVC compliant changes. Each entry in the resulting list identifies a specific syntax element, its original value, and a candidate alternative value. A syntax element that appears in this list is considered a changeable syntax element and can appear in the list more than once, each time with a different candidate alternative value.

Embodiments can also include the feature of a subset of the entries in this list being selected and used for watermarking. One choice of subset is to select one and only one candidate alternative value for each changeable syntax element. Another choice of subset is to select more than one candidate alternative values for each changeable syntax element, where each selection may represent different information to embed in the watermark. However, the list can contain changes that, although CABAC and AVC compliant, will not serve the goals of the particular application.

Furthermore, the current disclosure describes at least one implementation that selects a subset of entries in the list when the application is watermarking. The selection step is performed to find the best subset in a given set of watermarking goals that include high fidelity, high robustness, and high capacity. Herein, the selection process or step is referred to as Changeable Block Selection (CBS).

Turning to watermarking algorithms, it is important to point out several of their properties. One property is the visual impact of the watermark embedding, i.e. fidelity. For many watermarking applications, the visual impact should be as small as possible. Another property is the effectiveness of the watermark after embedding. This describes likelihood that a watermark detector will be able to recover a watermark immediately after embedding. For most applications, a very high effectiveness is required. If the watermarked content is to be subject to attacks between the time of embedding and detection, many watermarking applications require that the watermark data still be recoverable after such attacks. This leads to a third property, which is robustness. Finally, a watermarking algorithm can be characterized by the amount of data that can be embedded. This property is called the capacity.

Performance of these four properties is often traded one for another depending on the application. In embodiments of the invention, the trading or balancing of features can be thought of in two steps as illustrated in FIG. 1. After identifying the possible changeable syntax elements 105, the first step is the generation of a feature vector 110 for each changeable syntax element in an input list. An analysis is performed to estimate the fidelity, effectiveness, and robustness associated with each entry in the input list. The second step is to select a subset 115 of the changes for output. The subset selection is based on the desired balance between fidelity, effectiveness, robustness, and capacity, and yields 120 the selected changeable syntax elements.

Each changeable syntax element in the list includes a set of candidate alternative values. The syntax element value can be changed to any value in the set without interfering with the AVC/CABAC compliance of the bitstream. Replacing the value of the syntax element to a candidate alternative value will change the reconstructed pixel values in the block in which the syntax element resides. Therefore, for each candidate alternative value, several block features are evaluated. Some examples of block features include:

average luminance, before embedding and after;

mean square error between original and watermarked blocks;

block pixel variance, before embedding and after; and blockiness of a block relative to its neighborhood.

The substitution of a candidate alternative value of a changeable syntax element will change the imagery data at the target block (T) where the syntax element resides. Because a whole set of inter-dependency is present in the coded video stream, blocks other than T may also be affected by the substitution. In other words, a modification introduced into block T can propagate to other blocks in the decoded sequence. In order to truly access the impact of a candidate change on the fidelity, robustness, effectiveness, and capacity, a good selection process considers the pixel value changes due to propagation as well as the direct changes to block T. The building of a propagation map that indicates all of the blocks affected by a single change to block, T, can be extremely helpful and even paramount in determining the suitability of substitutions.

Figure 2:
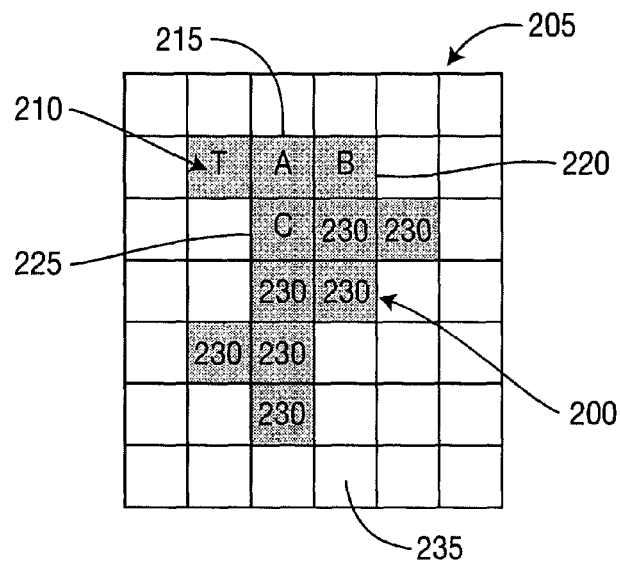
FIG. 2 provides an illustration of a propagation map.

An example propagation map or path 200 is illustrated in FIG. 2, wherein 7 by 6 matrix 205 of blocks of video are presented. Herein, the terms propagation map and propagation path are used interchangeably. In this example, a change is made directly to block T 210. Depending on the prediction mode of the neighboring blocks, this change can propagate to the right, down, down and to the right, and/or down and to the left. In this illustration, assume that the change has propagated to the right to block A 215. The change in block A can also propagate. In this illustration assume that this change propagates to blocks B 220 and C 225. Each of these changes can further propagate to other blocks having reference sign 230. The propagation map 200 indicates all of the blocks that will be affected by the initial change to block T. These blocks are the directly changed T block 200, the first order indirectly changed block A 215, the second order indirectly changes blocks B 220 and C 225, and the further affected blocks 230. The other blocks 235 in this example are unaffected.

When a change affects blocks other than the target block, the features considered should assess the impact in all affected blocks, not just the target block. Thus, a propagation map is generated and used to show the entire impact of the change as opposed to just considering the target block. Some examples of block features include:

the size of the propagation map;

the maximum luminance change of all blocks in the propagation path;

the maximum mean square error of all blocks in the propagation path; and the number of blocks in the propagation path that satisfy both a detectability test and a fidelity test.

To understand why usage of propagation maps is important, the consideration of a propagation map fidelity test in the selection steps can show which changes are acceptable if all the blocks in the propagation path pass a block-based fidelity test. In other words, a change will be unacceptable if it results in a visible artifact anywhere in its propagation path.

In general, a key feature of the invention is selection of a subset of the candidate alternatives. The selection process is based on the evaluation of a set of features as described above. The general process 305 is a tool that evaluates each candidate alternative in light of the feature values and the application requirements to do the subset selection.

Three application properties of the watermark are considered in the selection process. These three are detectability, fidelity, and robustness. For a change to be acceptable, it generally must satisfy application requirements in each of these properties.

Figure 3:
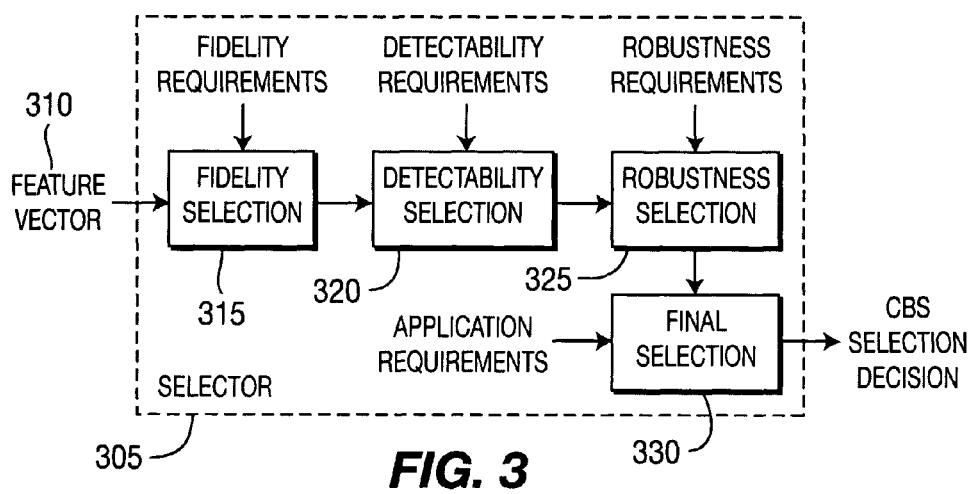
FIG. 3 illustrates a block diagram for the selection process for each candidate alternative value of a changeable syntax element.

FIG. 3 illustrates a block diagram for the selection process 305 for each candidate alternative value of a changeable syntax element where each block acts as a filter, passing only those candidate alternatives that pass a test based on the corresponding requirements. As mentioned above, after identifying the possible changeable syntax elements, the first step is the generation of a feature vector 310 for each changeable syntax element in an input list. Note that the only candidate alternatives that are evaluated by the block labeled "Final Selection" 330 are those that have passed the tests of the Fidelity Selection 315, Detectability Selection 320, and Robustness Selection 325. These three tests can be performed in any order.

The tests of FIG. 3 can be applied to each change, one at a time, or can be applied to a list of candidate alternatives. For example, a global threshold could be applied to each change individually, or the selection process can be configured to select the group of changes that has best performance. The former approach would not guarantee how many changes pass through the filters while the latter approach would not guarantee a minimum performance. The requirements of the application will indicate which of these two approaches are most appropriate. Note also that different approaches can be applied to each of the filters in FIG. 3. In the preferred embodiment, initial, fidelity, robustness, and detectability filtering are applied to each alternative individually, while the final selection acts on a list of changes that have passed the first three filters.

Fidelity selection can be based on a simple thresholding test applied to one or more of the generated features. Candidate elements that pass the threshold tests are deemed to have sufficiently high fidelity. Those that fail one or more of the thresholding tests are assumed to introduce visible artifacts too severe for the application. These candidates are removed from the list of potential changes.

In at least one embodiment, the feature vector includes the worst case, of all the blocks in the propagation path, of the sum (over all pixels in the block) of absolute luminance change that results from the change. This feature is compared to a luminance threshold. Any candidate which results in a block anywhere in its propagation path that has a sum of absolute luminance change greater than the threshold will be removed from the list.

At least one embodiment of the feature vector also includes the worst case, of all the blocks in the propagation path, of a blockiness measure indicating the amount of blockiness introduced by the change. This feature is compared to a blockiness threshold. Any candidate which results in a block anywhere in its propagation path that has a blockiness score greater than the blockiness threshold will be removed from the list.

A third possible fidelity test is based on the size of the propagation map. Here it is assumed that larger propagation maps are more likely to introduce visible artifacts. The size of the propagation map need not be listed as a feature since it is easily obtained directly from the data structure that contains the propagation map. Any candidate that has a propagation map which is larger than a threshold will be removed from the list.

In at least one embodiment, the recovery or robustness is based on the change in luminance in the block where the syntax element change is made. In other embodiments, the recovery can be based on the change in luminance in one or more blocks in the propagation path.

Thus, a simple measure of robustness is the amount of luminance change introduced by the candidate change. In this simple model, one assumes that candidate changes that result in higher luminance changes will be more robust.

In at least one embodiment, the feature vector includes the luminance change that will result from the candidate change. This value is compared to a robustness threshold. Any candidate for which the change in luminance is below the robustness threshold will be removed from the list.

When recovery is based on the entire propagation path, the size of the propagation map can be used to estimate the robustness of a change. Here it is assumed that larger propagation maps are more likely to survive processing of the marked video. Any candidate that has a propagation map which is smaller than a threshold will be removed from the list.

The final selection can be based on a number of different application requirements. One example of an application requirement is that, in a transport stream, the change must fully reside within a single transport stream packet. Any candidate change that would result in the modification of a syntax element that crosses transport stream packet boundaries will be removed from the list.

In at least one embodiment, the final selection process examines all of the candidate changes that have passed all of the previous tests in a slice. For a given syntax element, there may be a number of possible alternative values that satisfy the other tests, but only one can be selected for the final output. This choice may be based on the same fidelity and robustness features in the feature vector (e.g., selecting the value with the highest fidelity). This part of the selection could also be done in either of the other two selection processes.

In at least one embodiment, no change is made to any block that falls in the propagation path of a previously selected change. This rule is implemented in the final selection process, but could also be implemented elsewhere.

In at least one embodiment, no change is made if its propagation map would intersect with that of a previously selected change. This rule is implemented in the final selection process, but could also be implemented elsewhere.

Figure 4:
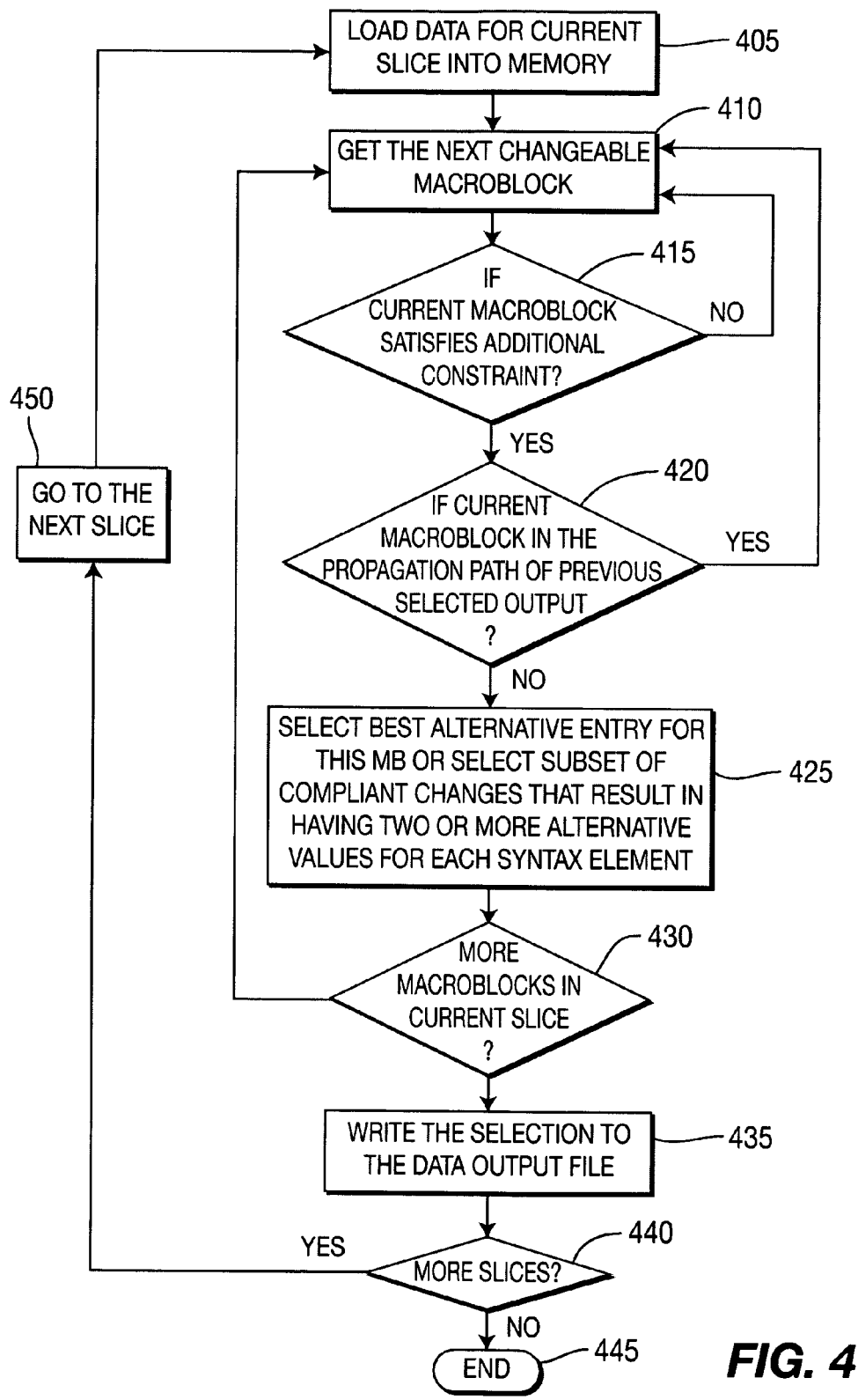
FIG. 4 is a flowchart that illustrates an actual implementation for the final selection step.

The final selection is illustrated in FIG. 4. Here, step 405 begins with loading data for a current slice into memory, which is followed by accessing each of the changeable macroblocks in step 410 and determining macroblock by macroblock if the current macroblock satisfies defined constraints defined by an application, a standard, a particular encoder, a visibility threshold, a bit length requirement, a payload requirement or the like in decision step 415. If not, the next macroblock in the slice is processed in step 410, and if the macroblock satisfies the defined constraints, then one proceeds to decision step 420. In step 420, if the current macroblock is in the propagation path of the previously selected output, then the next macroblock in the slice is processed in step 410, and if the current macroblock is not in the propagation path of the previously selected output, then one proceeds to decision step 430, wherein the best alternative entry for the current macroblock is selected. In step 430, one advances to next step 435 if there are not further macroblocks in the slice, and if there are more macroblocks in the slice, then the next macroblock in the slice is processed in step 410. When there are not more macroblocks to process, in step 435, the final selection is written to the data output. If there are more slices in the video frame to evaluate, then one accesses the next slice in step 405, and if there are not further slices 440, then the final selection is complete in step 445. Several of the implementations and features described in this application may be used in the context of the H.264/MPEG-4 AVC (AVC) standard. However, these implementations and features may be used in the context of another standard, which can be existing or future, or in a context that does not involve a standard. Thus, provided herein is one or more implementations having particular features and aspects. However, features and aspects of described implementations may also be adapted for other implementations.

The implementations described herein may be implemented in, for example, a method or process, an apparatus, a software program, a datastream, or a signal. Even if only discussed in the context of a single form of implementation such as being discussed only as a method, the implementation or features discussed may also be implemented in other forms such as an apparatus or program. An apparatus may be implemented in appropriate hardware, software, and firmware. The methods may be implemented in an apparatus such as a computer or other processing device. Additionally, the methods may be implemented by instructions being performed by a processing device or other apparatus, and such instructions may be stored on a computer readable medium such as a CD, or other computer readable storage device, or an integrated circuit. Further, a computer readable medium may store the data values produced by an implementation.

As should be evident to one of skill in the art, implementations may also produce a signal formatted to carry information that can be stored or transmitted. The information can include instructions for performing a method, or data produced by one of the described implementations. For example, a signal may be formatted to carry a watermarked stream, an unwatermarked stream, a fidelity measure, or other watermarking information.

Additionally, many implementations may be implemented in one or more of an encoder, a decoder, a post-processor processing output from a decoder, or a pre-processor providing input to an encoder. Further, other implementations are contemplated by this disclosure. For example, additional implementations may be created by combining, deleting, modifying, or supplementing various features of the disclosed implementations.

The invention claimed is:

1. A method comprising:
accessing changes in a list for coded data, the changes having a syntax element, an original value and one or more candidate alternative values;
determining for a subset a group of compliant changes from the list of changes, the compliant changes being compliant with a coding protocol;
selecting for the subset only compliant changes also meeting at least one performance criterion; and
removing or preventing changes from being in the subset if the propagation path of said changes intersect with the propagation path of a previously selected change in the subset, wherein a propagation path for a change consists of all the blocks in the encoded data which are affected by said change.

2. The method of claim 1 wherein the coding protocol is a CABAC encoding protocol, the changes are watermarks, and the coded data is a video stream.

3. The method of claim 2 comprising:
determining fidelity, recoverability, or robustness of the watermarks; and removing or preventing watermarks from being in the subset responsive to the fidelity, recoverability, or robustness, wherein fidelity, recoverability, and robustness are performance criteria.

4. A method comprising:
accessing changes or watermarks in a list for coded data, the changes or watermarks having a syntax element, an original value and one or more candidate alternative value;
determining for a subset a group of compliant changes or watermarks from the changes or watermarks, the compliant changes or watermarks being compliant with application requirements and a coding protocol;
selecting for the subset only compliant changes or watermarks having at least one performance criterion other than the coding protocol;
providing the coded data in a transport stream; and
removing or preventing changes or watermarks from being in the subset that have a syntax element that crosses a transport stream packet boundary.

5. The method of claim 4 comprising:
determining fidelity, recoverability, or robustness of the changes or watermarks and removing or preventing changes or watermarks from being in the subset responsive to the fidelity, recoverability, or robustness, wherein fidelity, recoverability, and robustness are performance criteria.

6. The method of claim 4, wherein the coding protocol is a CABAC encoding protocol and the coded data is a video stream.

7. The method of claim 4 comprising:
removing or preventing changes from being in the subset that have any blocks that fall in a propagation path of a previously selected change in the subset, wherein a propagation path for a change consists of all the blocks in the encoded data which are affected by said change.

8. The method of claim 5, wherein the step of determining fidelity comprises
calculating the sum of the absolute change in the luminance for each block in the propagation path of a change, wherein said sum is calculated over all the pixels of the block;
determining the worst case sum among all the blocks in the propagation path of a change;
comparing the worst case sum to a luminance threshold; and the step of removing comprises:
removing said change from the subset if the worst case sum is greater than said threshold.

9. The method of claim 5, wherein the step of determining fidelity comprises:
calculating a blockiness measure for each block in the propagation path of a change;
determining the worst case blockiness among all the blocks in the propagation path of a change;
comparing the worst case blockiness to a blockiness threshold; and
the step of removing comprises:
removing said change from the subset if the worst case blockiness is greater than said threshold.

10. The method of claim 5, wherein the step of determining fidelity comprises:
determining the size of the propagation map of a change, wherein the size is the number of blocks affected by the change;
comparing the size of the propagation map to a size threshold; and
the step of removing comprises:
removing a change from the subset if the size of the propagation map is greater than said threshold.

11. The method of claim 5, wherein the step of determining robustness comprises:
calculating the change in the luminance for each block associated with a change;
comparing the change in the luminance to a robustness threshold; and
the step of removing comprises:
removing a change from the subset if the change in the luminance is smaller than said threshold.

12. The method of claim 5, wherein the step of determining robustness comprises:
calculating the change in the luminance in at least one block in the propagation path of a change;
comparing the at least one change in the luminance to a robustness threshold; and
the step of removing comprises:
removing a change from the subset if the at least one change in the luminance is smaller than said threshold.

13. The method of claim 4 comprising:
removing changes from the subset if the propagation path of said changes intersect with the propagation path of a previously selected change in the subset.

14. The method of claim 4, wherein a syntax element that appears in the list can appear in the list in more than one entry, wherein in each entry will have a different alternative value.

15. The method of claim 3, wherein the step of determining fidelity comprises calculating the sum of the absolute change in the luminance for each block in the propagation path of a change, wherein said sum is calculated over all the pixels of the block;
determining the worst case sum among all the blocks in the propagation path of a change;
comparing the worst case sum to a luminance threshold; and
the step of removing comprises:
removing said change from the subset if the worst case sum is greater than said threshold.

16. The method of claim 3, wherein the step of determining fidelity comprises:
calculating a blockiness measure for each block in the propagation path of a change;
determining the worst case blockiness among all the blocks in the propagation path of a change;
comparing the worst case blockiness to a blockiness threshold; and
the step of removing comprises:
removing said change from the subset if the worst case blockiness is greater than said threshold.

17. The method of claim 3, wherein the step of determining robustness comprises:
calculating the change in the luminance for each block associated with a change;
comparing the change in the luminance to a robustness threshold; and
the step of removing comprises:
removing a change from the subset if the change in the luminance is smaller than said threshold.

18. The method of claim 3, wherein the step of determining robustness comprises:
calculating the change in the luminance in at least one block in the propagation path of a change;
comparing the at least one change in the luminance to a robustness threshold; and
the step of removing comprises:
removing a change from the subset if the at least one change in the luminance is smaller than said threshold.

19. The method of claim 3, wherein the step of determining robustness comprises:
determining the size of the propagation map of a change, wherein the size is the number of blocks affected by the change;
comparing the size of the propagation man to a size threshold; and
the step of removing comprises:
removing a change from the subset if the size of the propagation map is smaller than said threshold.

20. The method of claim 1, wherein a syntax element that appears in the list can appear in the list in more than one entry, wherein in each entry will have a different alternative value.

* * * * *